US010210441B2

(12) United States Patent
Ogaki

(10) Patent No.: US 10,210,441 B2
(45) Date of Patent: Feb. 19, 2019

(54) INFORMATION PROCESSING APPARATUS FOR CONTROLLING TO EXECUTE A JOB USED FOR MANUFACTURING A PRODUCT

(71) Applicant: CANON KABUSHIKI KAISHA, Tokyo (JP)

(72) Inventor: Tetsuro Ogaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/840,379

(22) Filed: Dec. 13, 2017

(65) Prior Publication Data
US 2018/0181847 A1    Jun. 28, 2018

(30) Foreign Application Priority Data
Dec. 22, 2016    (JP) ................................. 2016-249674

(51) Int. Cl.
| G06K 1/00 | (2006.01) |
| G06K 15/00 | (2006.01) |
| G06Q 10/06 | (2012.01) |
| G06K 15/02 | (2006.01) |
| G06Q 50/28 | (2012.01) |
| G06Q 50/04 | (2012.01) |

(52) U.S. Cl.
CPC ..... *G06K 15/4045* (2013.01); *G06K 15/1836* (2013.01); *G06K 15/403* (2013.01); *G06Q 10/06395* (2013.01); *G06Q 50/04* (2013.01); *G06Q 50/28* (2013.01)

(58) Field of Classification Search
None
See application file for complete search history.

(56) References Cited

U.S. PATENT DOCUMENTS

| 6,249,607 | B1 * | 6/2001 | Murakawa | ............. | G06K 9/522 |
| | | | | | 382/199 |
| 7,003,162 | B2 * | 2/2006 | Ohashi | ................... | G06K 9/036 |
| | | | | | 382/218 |
| 7,475,061 | B2 * | 1/2009 | Bargeron | .......... | G06F 17/30011 |
| 7,593,961 | B2 * | 9/2009 | Eguchi | .............. | G06F 17/30259 |
| 7,911,510 | B2 * | 3/2011 | Chosa | .................. | G11B 27/034 |
| | | | | | 348/231.2 |
| 8,259,327 | B2 * | 9/2012 | Tanaka | ................... | G06Q 30/02 |
| | | | | | 270/1.02 |
| 8,386,437 | B2 * | 2/2013 | Monet | ............... | G06F 17/30011 |
| | | | | | 707/665 |
| 9,075,827 | B2 * | 7/2015 | Magai | .................... | G06K 9/033 |

(Continued)

FOREIGN PATENT DOCUMENTS

JP    2014-010723 A    1/2014

*Primary Examiner* — Dung D Tran
(74) *Attorney, Agent, or Firm* — Venable LLP

(57) ABSTRACT

An information processing apparatus of the present invention manages whether to set each of a plurality of images as a retrieval target in a management unit, retrieves an image similar to an image of a first product from a plurality of images managed as retrieval targets by the management unit in a case where an instruction to start the execution of jobs for manufacturing the first product is issued, and performs control to execute the jobs used for manufacturing the first product and controls the management unit to manage an image corresponding to the first product as a retrieval target in a case where no image similar to the image of the first product is retrieved.

17 Claims, 13 Drawing Sheets

(56) References Cited

U.S. PATENT DOCUMENTS

| | | | |
|---|---|---|---|
| 9,465,851 B2 | 10/2016 | Kishi et al. | |
| 9,619,182 B2 * | 4/2017 | Miyata | G06F 3/1267 |
| 9,772,809 B2 * | 9/2017 | Bannai | G06F 3/1238 |
| 9,824,447 B2 * | 11/2017 | Wakita | G06F 17/30247 |
| 2006/0225570 A1 * | 10/2006 | Levine | B42C 11/02 |
| | | | 95/109 |
| 2008/0104011 A1 * | 5/2008 | Shibasaki | G06F 17/30247 |
| 2016/0034497 A1 * | 2/2016 | Ikeda | G06F 17/30256 |
| | | | 707/741 |
| 2016/0055394 A1 * | 2/2016 | Kanada | G06T 7/0014 |
| | | | 382/128 |
| 2018/0060006 A1 * | 3/2018 | Hayashi | G06F 3/1265 |

* cited by examiner

| Order ID | Product Name | Delivery Name | Delivery Address | Image File Path | Image ID |
|---|---|---|---|---|---|
| Job_0000001189 | AQUARIUM Ticket | AAA | 9-1,Imaikami-Cho,Nakahara-Ku, Kawasaki-Shi,211-8501,Japan | C:¥test¥images¥ticket.bmp | 100 |
| Job_0000001190 | Flyer A | BBB | 3-30-2,Shimomaruko,Oota-Ku, Tokyo,146-8501,Japan | C:¥test¥images¥flyerA.bmp | 200 |
| Job_0000001189 | Campaign Postcard | AAA | 9-1,Imaikami-Cho,Nakahara-Ku, Kawasaki-Shi,211-8501,Japan | C:¥test¥images¥postcard.bmp | 300 |
| Job_0000001190 | Flyer B | BBB | 3-30-2,Shimomaruko,Oota-Ku, Tokyo,146-8501,Japan | C:¥test¥images¥flyerB.bmp | 400 |
| Job_0000001191 | Book | CCC | 5-1,Hakusan 7-chome,Toride-shi, Ibaraki 302-8501,Japan | C:¥test¥images¥Book.bmp | 500 |

FIG.6

|     | 700 | 701 | 702 | 703 | 704 |
| --- | --- | --- | --- | --- | --- |
| Order ID | Product Name | Job | Job Status | Similar Product |
| Job_0000001189 | AQUARIUM Ticket | Printing | Processing | None |
| Job_0000001170 | Flyer A | Printing | Processing | None |
| Job_0000001189 | Campaign Postcard | Printing | Processing | None |
| Job_0000001170 | Flyer B | Printing | Processing | None |
| Job_0000001191 | Book | Printing | Processing | Flyer A |
| Job_0000001191 | Book | Stitching | Pending | Flyer A |

FIG.7

| Image File Path | Image ID | In Process |
|---|---|---|
| C:¥test¥images¥ticket.bmp | 100 | True |
| C:¥test¥images¥flyerA.bmp | 200 | True |
| C:¥test¥images¥postcard.bmp | 300 | True |
| C:¥test¥images¥flyerB.bmp | 400 | True |
| C:¥test¥images¥Book.bmp | 500 | False |

FIG.8

INFORMATION PROCESSING APPARATUS FOR CONTROLLING TO EXECUTE A JOB USED FOR MANUFACTURING A PRODUCT

BACKGROUND OF THE INVENTION

Field of the Invention

The present invention relates to an information processing apparatus, an information processing method, and a storage medium, which are mainly used for pre-shipment inspection.

Description of the Related Art

In commercial printing industry, various products have conventionally been manufactured by the combination of an image forming apparatus and a post-processing apparatus. For example, printed matter produced in a printing process in an image forming apparatus is then subjected to a post-process (finishing process) such as bookbinding and cutting, thereby manufacturing products in various formats such as books, catalogs, flyers, tickets, and business cards.

The manufactured products are generally packed together with invoices or delivery slips and then shipped. In this case, an operator identifies the products based on identification information (such as bar codes) assigned to the products when packing invoices or delivery slips corresponding to the products.

In some cases, however, identification information such as bar codes cannot be assigned to products such as flyers, tickets, and business cards for design or space reasons, which makes product identification difficult. Accordingly, in such a case where identification information such as bar codes cannot be assigned to products, identifying a product by capturing an image of the product and executing similar image retrieval based on image features of the product is taken into consideration. For instance, Japanese Patent Laid-Open No. 2014-10723 discloses a method of associating an image of an object with cooperative information, registering them in a database, retrieving a similar image from the database based on image features using a captured image of the object, and suggesting cooperative information associated with the similar image. However, this similar image retrieval based on image features has a problem that if there are a plurality of images having a high degree of similarity of image features, an incorrect one is selected as a candidate.

The present invention has been accomplished in consideration of the above conventional problem. The object of the present invention is to prevent a product from being shipped to an incorrect delivery address.

SUMMARY OF THE INVENTION

To attain the above object, an information processing apparatus of the present invention comprises: a management unit configured to manage whether to set each of a plurality of images as a retrieval target; a retrieval unit configured to retrieve an image similar to an image of a first product from a plurality of images managed as retrieval targets by the management unit in a case where an instruction to start execution of jobs for manufacturing the first product is issued; and a control unit configured to perform control to execute the jobs used for manufacturing the first product and to control the management unit to manage an image corresponding to the first product as a retrieval target in a case where no image similar to the image of the first product is retrieved by the retrieval unit.

Further features of the present invention will become apparent from the following description of exemplary embodiments with reference to the attached drawings.

BRIEF DESCRIPTION OF THE DRAWINGS

FIG. 6 is a table showing order information stored in an order information storage unit of the information processing apparatus according to the embodiment of the present invention;

FIG. 7 is a table showing information about jobs stored in a job storage unit of the information processing apparatus according to the embodiment of the present invention;

FIG. 8 is a table showing information about images stored in a feature DB of the information processing apparatus according to the embodiment of the present invention;

DESCRIPTION OF THE EMBODIMENTS

The configuration of a product manufacturing system according to an embodiment of the present invention will be described with reference to the drawings.

Figure 1:
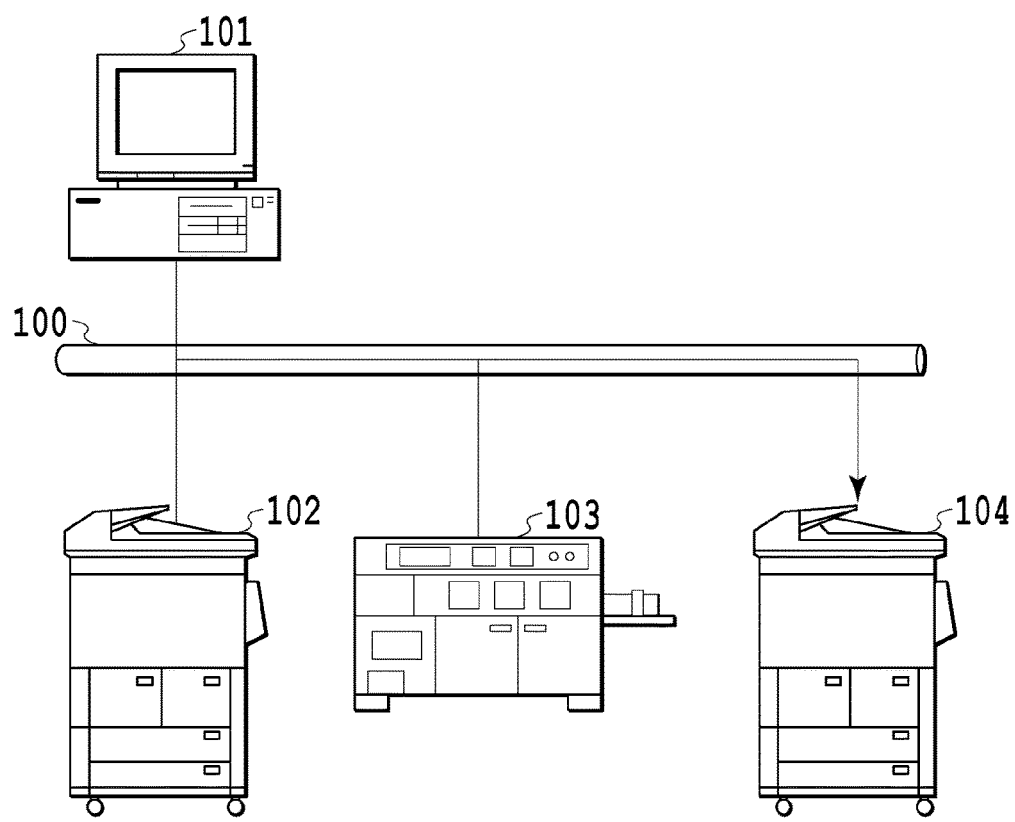
FIG. 1 is an illustration of the entire configuration of a product manufacturing system according to an embodiment of the present invention.

FIG. 1 is an illustration of the entire configuration of the product manufacturing system according to the embodiment of the present invention. It should be noted that the entire configuration of the product manufacturing system in FIG. 1 is shown to facilitate the understanding of the present invention and the configuration is not limited to this. As shown in FIG. 1, the product manufacturing system is formed by, for example, connecting an information processing apparatus 101, an image forming apparatus 102, a post-processing apparatus 103, and an image forming apparatus 104 to a network 100 such as the Internet.

The information processing apparatus 101 executes various programs such as a job management program for managing the manufacture of printed matter, a web server, a pre-shipment inspection program used upon shipment, and a bar code reading program. Further, a printer driver program or the like for controlling the image forming apparatuses 102 and 104 is installed on the information processing apparatus 101. The information processing apparatus 101 analyzes order information and the like and generates print data for printing in the image forming apparatuses 102 and 104.

The image forming apparatus 102 analyzes print data including text print data transmitted from the information processing apparatus 101, converts the data into a dot image page by page, and executes a printing process. Printed matter produced by the image forming apparatus 102 is hand-carried by a print operator to the post-processing apparatus 103 or conveyed by a belt conveyor (not shown) to the post-processing apparatus 103.

The post-processing apparatus 103 executes a post-process such as binding, punching, or folding for the printed matter produced by the image forming apparatus 102 based on a job (i.e. a command) transmitted from the information processing apparatus 101. In FIG. 1, the post-processing apparatus 103 is not physically connected to the image forming apparatus 102 but can communicate with the information processing apparatus 101 and the image forming apparatus 102 via the network 100.

Like the image forming apparatus 102, the image forming apparatus 104 analyzes print data including text print data transmitted from the information processing apparatus 101 and the like, converts the data into a dot image page by page, and executes a printing process. Printed matter (i.e. an invoice or delivery slip) output from the image forming apparatus 104 is packed and shipped by a print operator together with a product obtained by executing a post-process for printed matter produced by the image forming apparatus 102.

FIG. 1 shows each of the information processing apparatus 101, the image forming apparatus 102, the post-processing apparatus 103, and the image forming apparatus 104 as a single apparatus for example, but each of them may include a plurality of apparatuses.

Figure 2:
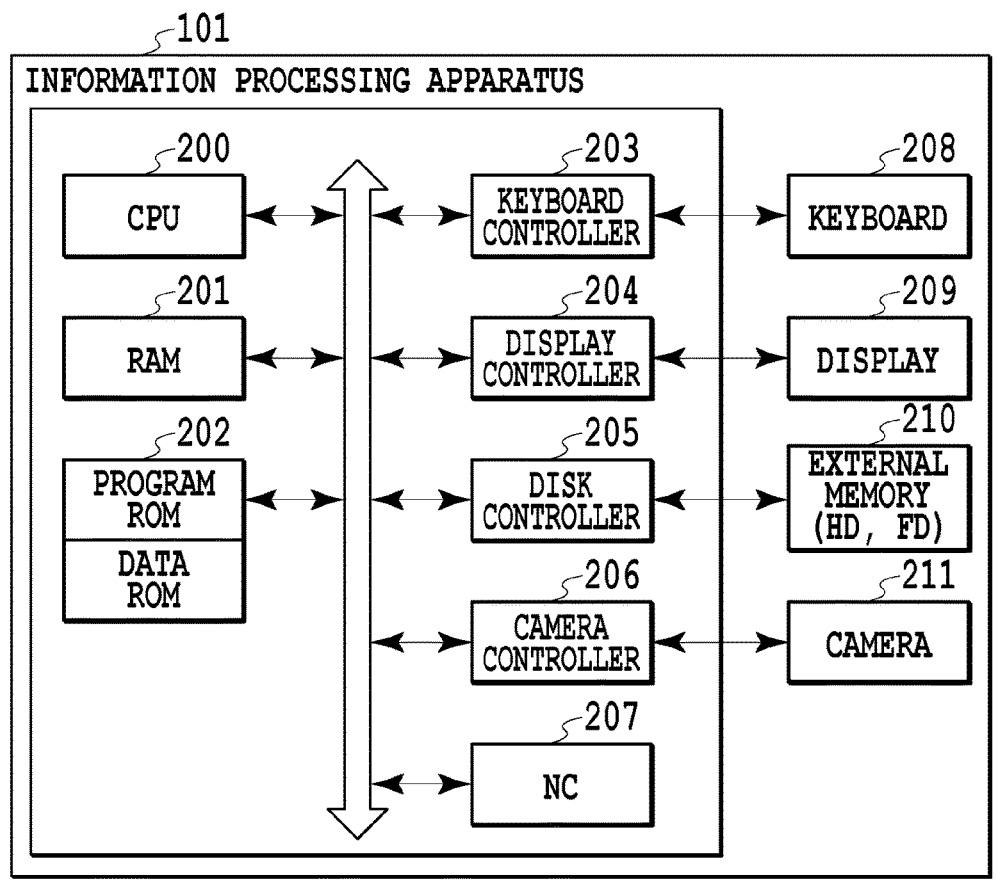
FIG. 2 is a block diagram showing the hardware configuration of an information processing apparatus according to the embodiment of the present invention.

FIG. 2 is a block diagram showing the hardware configuration of the information processing apparatus 101 according to the embodiment of the present invention. The information processing apparatus 101 may be a general personal computer.

In FIG. 2, a CPU 200 is a central processing unit that controls the entire information processing apparatus 101. The CPU 200 executes programs such as a program stored in a program ROM in a ROM 202, an operation system (OS) loaded from an external memory 210 such as a hard disk into a RAM 201, and an application program. That is, the CPU 200 executes various programs stored in a readable storage medium, thereby functioning as each of processing units that execute processes in flowcharts described later.

The RAM (random access memory) 201 is a main memory of the CPU 200 and functions as a work area and the like. The ROM (read only memory) 202 includes a program ROM and a data ROM and stores programs executed by the CPU 200. A keyboard controller 203 controls operation input from a keyboard 208, a bar code reader (not shown), and a pointing device (such as a mouse, touchpad, touch panel, and trackball; not shown).

A display controller 204 controls display on a display 209. A disk controller 205 controls data access to the external memory 210 such as a hard disk (HD) and a flexible disk (FD) for storage of various kinds of data. A camera controller 206 controls input of captured image data from a camera 211. A network controller (NC) 207 is connected to the network and executes a process to control communications with other devices connected to the network.

Figure 3:
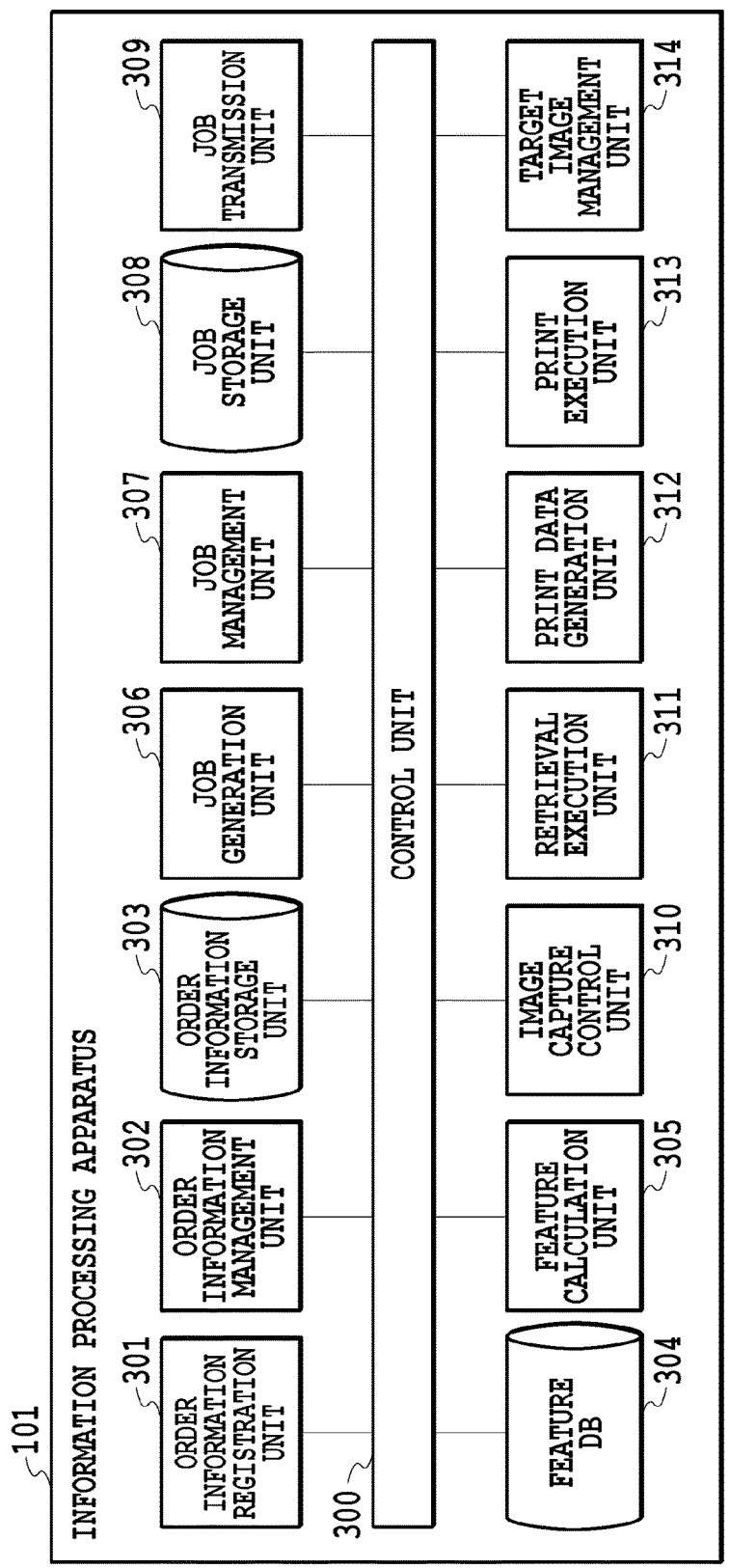
FIG. 3 is a block diagram showing the software configuration of the information processing apparatus according to the embodiment of the present invention.

FIG. 3 is block diagram showing the software configuration of the information processing apparatus 101 according to the embodiment of the present invention. FIG. 3 shows each function of the information processing apparatus 101. A control unit 300 controls the execution of each of functional blocks 301 to 314 of the information processing apparatus 101. An order information registration unit 301 performs control relating to a process of registering order information in FIG. 6 described later in the information processing apparatus 101. More specifically, the order information registration unit 301 analyzes each row of order information received from a host application or server such as MIS and passes the analysis result of each row to the control unit 300. The analysis results include, for example, a file path of an image file of print data stored in a format such as bitmap or JPEG and a delivery address of printed matter.

An order information management unit 302 controls data exchange with an order information storage unit 303. That is, the order information management unit 302 receives the analysis results of the order information from the control unit 300 and stores them in the order information storage unit 303. The order information storage unit 303 stores the analysis results of the order information. The order information storage unit 303 may store the analysis results in the RAM 201, store them as a file in the external memory 210, or store them in a data storage program such as a database.

The control unit 300 extracts a file path of an image file from the analysis results of the order information stored in the order information storage unit 303, then acquires the image file (i.e. a product image) based on the file path, and registers the acquired image file in a feature DB 304. That is, an image file of an ordered product is registered in the feature DB 304. When an image file is registered in the feature DB 304, the feature DB 304 returns an image ID of the image file to the control unit 300. In this case, the control unit 300 associates the image ID returned from the feature DB 304 with the analysis results and passes them to the order information management unit 302. The order information management unit 302 associates the image ID received from the control unit 300 with the analysis results and stores them in the order information storage unit 303. A feature calculation unit 305 calculates features of the image file registered in the feature DB 304, associates the image ID of the image file with the features, and registers them in the feature DB 304.

A job generation unit 306 receives the analysis results of the order information from the control unit 300, calculates steps necessary for manufacturing the ordered product, and generates the calculated steps as jobs. The jobs include, for example, a print job used for a printing process in the image forming apparatus 102 and a finishing job used for a post-process in the post-processing apparatus 103. Information about each job is generated in the job generation unit 306 and then passed to the control unit 300.

A job management unit 307 controls data exchange with a job storage unit 308. That is, upon receipt of job information from the control unit 300, the job management unit 307 associates the job information with the order information and stores them in the job storage unit 308. The job storage unit 308 may store the information in the RAM 201, store it as a file in the external memory 210, or store it in a data storage program such as a database.

A job transmission unit 309 corresponds to a job control unit and a delivery address acquisition unit of the present invention. The job transmission unit 309 receives the job information stored in the job storage unit 308 from the control unit 300 and transmits it to the image forming apparatus 102 and the post-processing apparatus 103. A job to be transmitted is selected based on operation input accepted by the keyboard controller 203 and the like. At the start of a transmission process of a job, the job transmission unit 309 passes an image file to a retrieval execution unit 311 based on a path of the image file included in order information about an order associated with the job, whose transmission process is started, received from the order information management unit 302 to the control unit 300. An image capture control unit 310 controls the start/stop of capture of printed matter with the camera 211 to generate a captured image. The captured image is generated in a file format such as bitmap or JPEG.

The retrieval execution unit 311 is instructed by the control unit 300 to execute retrieval from the feature DB 304 using query image data. The retrieval execution unit 311 compares features of images set as retrieval targets with features of the query image data, retrieves an image having a degree of similarity of features equal to or greater than a threshold (i.e. an image having similar image features), and passes an image ID of the retrieved image to the control unit 300. The retrieval execution unit 311 executes retrieval only from images with a manufacture possible status flag of "True." If the degree of similarity of features is less than the threshold as to all the retrieval target images, the retrieval execution unit 311 returns no image ID and determines that no applicable result exists. The manufacture possible status means a status where all jobs necessary for manufacturing a product are transmitted from the job transmission unit 309. At the stage of job execution control (FIG. 12 described later), when a similar image retrieval result is received from the retrieval execution unit 311, the job transmission unit 309 executes transmission of a job or suspends the job based on the similar image retrieval result. Then, the control unit 300 receives a job status indicating job transmission or job suspension from the job transmission unit 309 and passes it to the job management unit 307, thereby storing it in the job storage unit 308.

A print data generation unit 312 receives an image ID from the control unit 300, then acquires order information from the image ID, and generates print data based on the order information. A print execution unit 313 is a control mechanism that controls the execution of printing by transmitting the print data generated by the print data generation unit 312 to the image forming apparatuses 102 and 104.

A target image management unit 314 receives information about a product, all jobs necessary for manufacturing the product having been transmitted from the job transmission unit 309, and sets the value of the manufacture possible status flag to "True" such that an image of the product becomes a retrieval target in the feature DB 304. Further, the target image management unit 314 sets the value of the manufacture possible status flag of a product, whose pre-shipment inspection has been completed, to "False" such that an image of the product is excluded from retrieval targets in the feature DB 304. The pre-shipment inspection means a process to check whether a manufactured product is no different from a product to be shipped.

Figure 4:
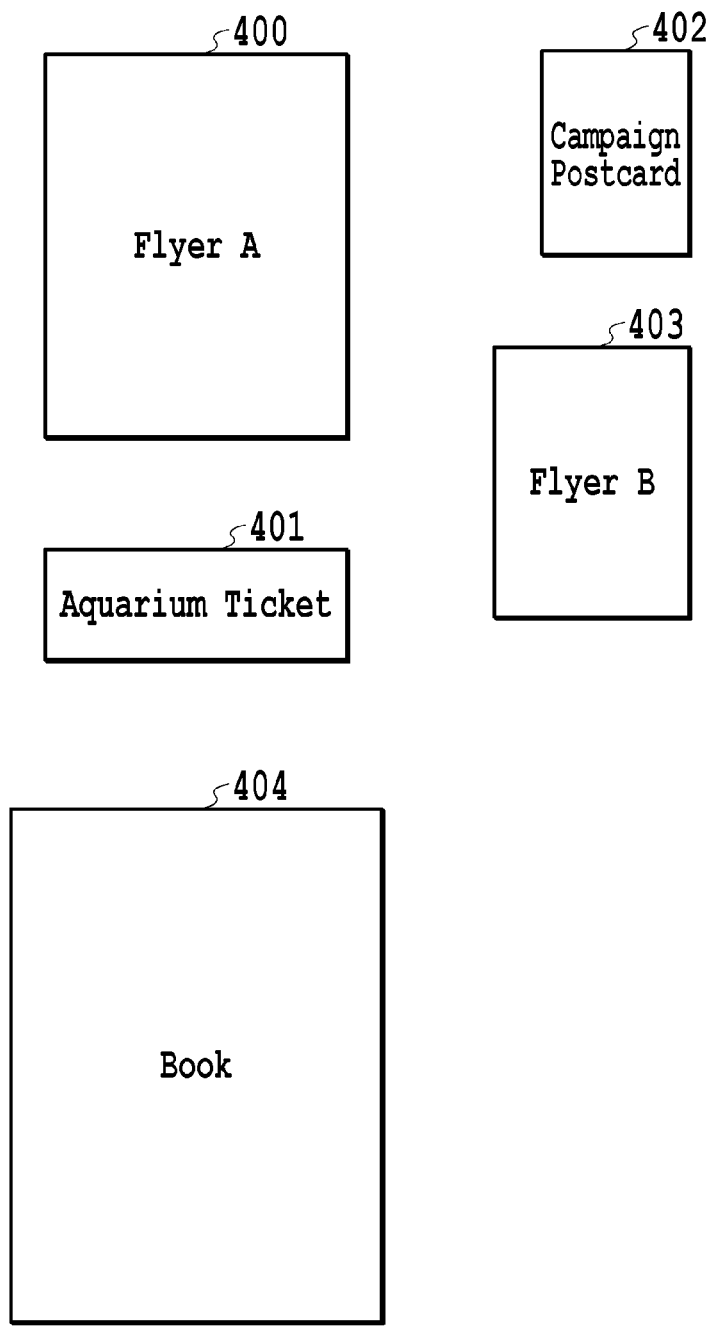
FIG. 4 is an illustration of an example of products manufactured in the product manufacturing system according to the embodiment of the present invention.

FIG. 4 is an illustration of an example of products manufactured in the product manufacturing system according to the embodiment of the present invention. FIG. 4 shows printed matter as an example of the products. Reference numbers 400 and 403 denote flyers, 401 denotes a ticket, 402 denotes a campaign postcard such as a direct mail, and 404 denotes a pamphlet or the like. It is assumed that print data (such as a size and content for printing on a sheet) used for a printing process of the flyer 400 is different from that used for a printing process of the flyer 403.

Figure 5:
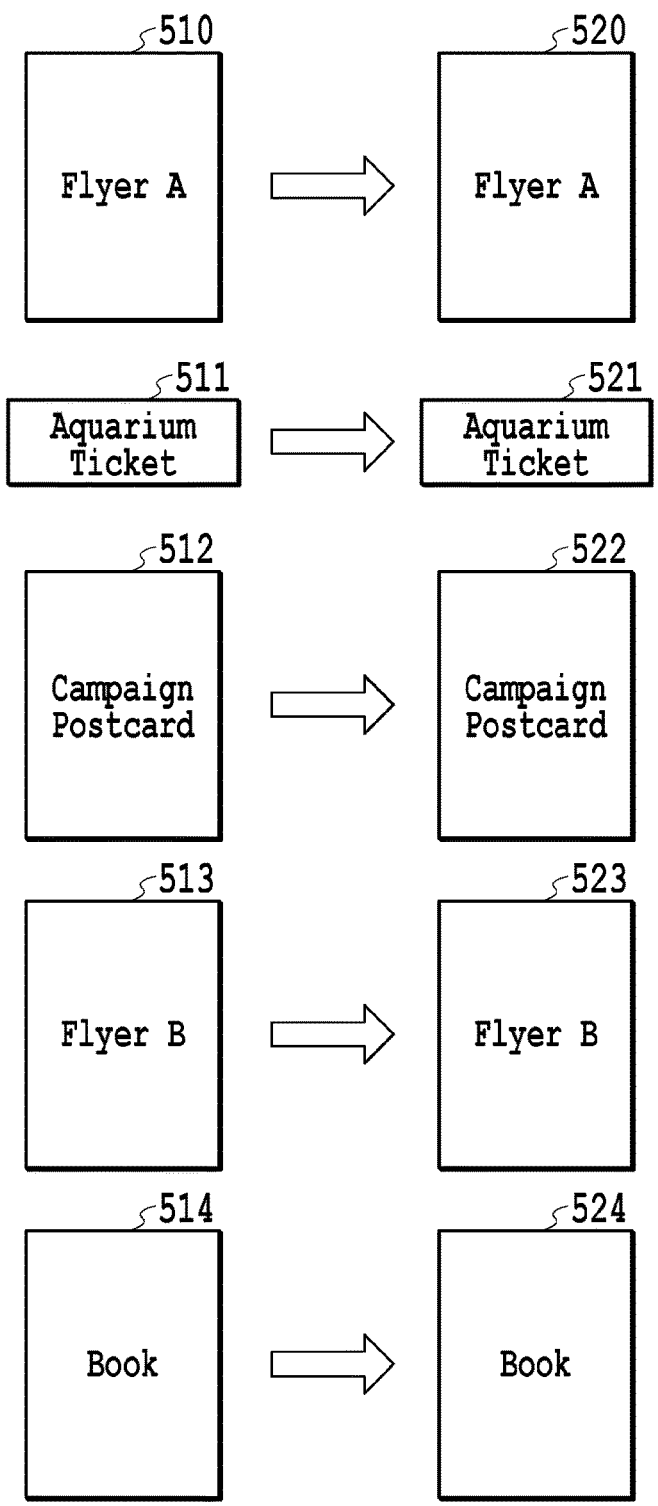
FIG. 5 is an illustration of image files of the products.

FIG. 5 is an illustration of image files of the products. Image files 520 to 524 shown in FIG. 5 are generated in a format such as bitmap or JPEG based on the print data 510 to 514 for the ordered products, respectively, and are stored in given file paths in the external memory 210 (604 in FIG. 6 described later).

FIG. 6 is a table showing order information stored in the order information storage unit 303 of the information processing apparatus 101 according to the embodiment of the present invention. In FIG. 6, column 600 denotes an order ID for identifying each order, column 601 denotes a product name corresponding to each order, column 602 denotes a delivery name of each order, and column 603 denotes a delivery address of each order. Column 604 denotes a file path of an image file corresponding to each order. The example of FIG. 6 shows storage destinations of the image files 520 to 524 shown in FIG. 5. Column 605 denotes an image ID of the image file relating to each order. The image IDs shown in column 605 are acquired when image data acquired based on the file paths in column 604 is registered in the feature DB 304, and are stored by the order information management unit 302.

FIG. 7 is a table showing information about jobs stored in the job storage unit 308 of the information processing apparatus 101 according to the embodiment of the present invention. In FIG. 7, columns 700 and 701 correspond to columns 600 and 601 in the order information in FIG. 6, respectively. Column 702 denotes the type of job (i.e. a step of a job) necessary for manufacturing each product.

Column 703 denotes the status of each job. For example, whether a job is in a pending, processing, or completed status is shown as the job status. In column 704, if an image similar to a product of a job is retrieved (i.e. if the transmission of the job from the job transmission unit 309 is suspended), the job management unit 307 stores a product name corresponding to the similar image which causes the suspension. If no image similar to a product of a job is retrieved (i.e. if the job is transmitted from the job transmission unit 309), the job management unit 307 stores "None" in column 704.

FIG. 8 is a table showing information about images stored in the feature DB 304 of the information processing apparatus 101 according to the embodiment of the present invention. In FIG. 8, columns 800 and 801 correspond to columns 604 and 605 of the order information stored in the order information storage unit 303 in FIG. 6, respectively. Column 802 shows whether each product is in the manufacture possible status (i.e. the manufacture possible status flag). In other words, column 802 shows whether all jobs necessary for manufacturing each product are transmitted from the job transmission unit 309.

Figure 9:
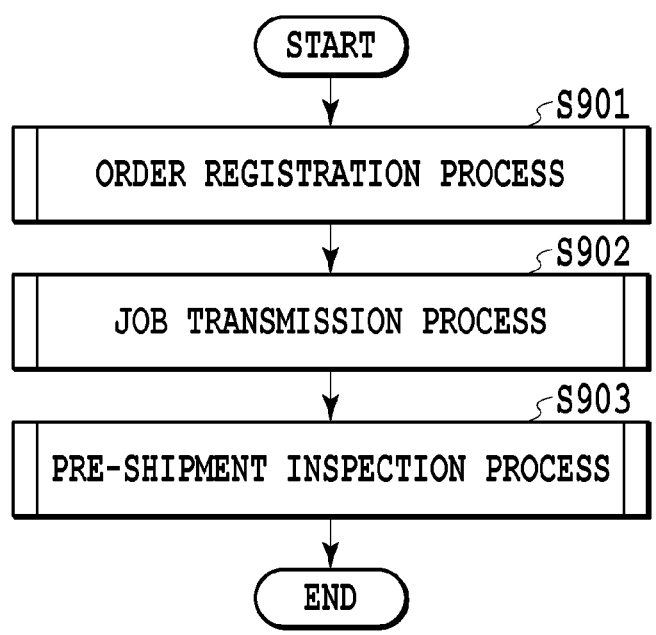
FIG. 9 is a flowchart showing the flow of processes from order acceptance to pre-shipment inspection in the product manufacturing system according to the embodiment of the present invention.

FIG. 9 is a flowchart showing the flow of processes from order acceptance to pre-shipment inspection in the product manufacturing system according to the embodiment of the present invention. A program for executing each process is stored in the ROM 202 of the information processing apparatus 101, loaded into the RAM 201, and executed by the CPU 200.

As shown in FIG. 9, the information processing apparatus 101 generates steps necessary for manufacturing an ordered product as jobs, and executes a registration process for registering the generated jobs (S901). Next, the information processing apparatus 101 selects a job to be transmitted from the registered jobs and executes a transmission process of the selected job (S902). After the job is transmitted and the product is manufactured, the information processing apparatus 101 executes a pre-shipment inspection process (S903). The job registration process in step S901, the job transmission process in step S902, and the pre-shipment inspection process in step S903 will be described in detail with reference to FIGS. 10, 11, and 13 described later, respectively.

Figure 10:
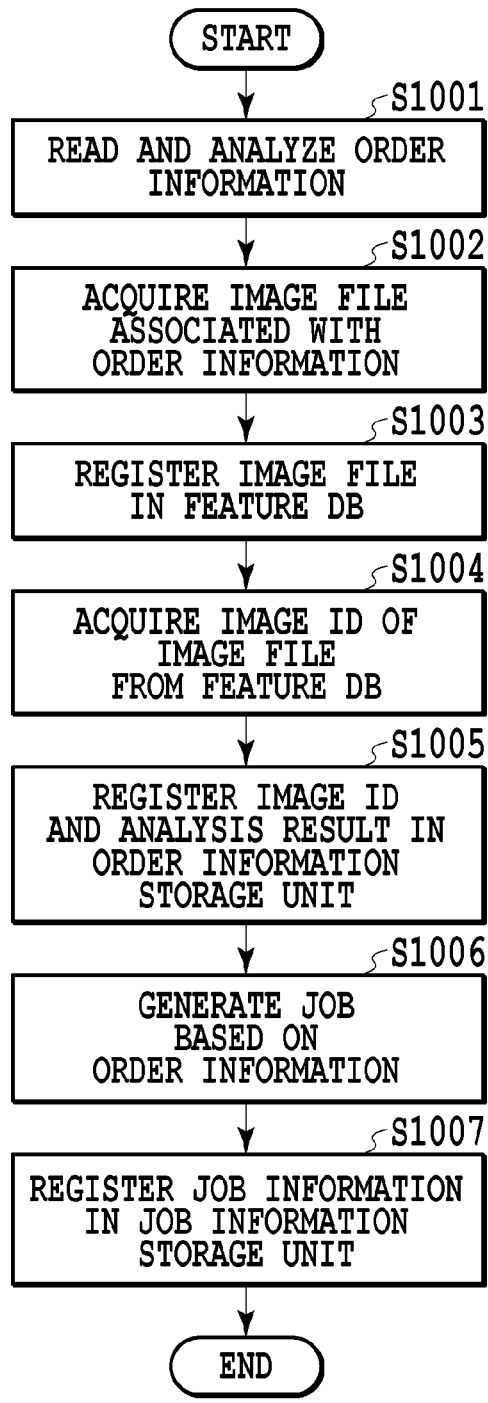
FIG. 10 is a flowchart showing the flow of processes from reading of order information to generation and registration of information about jobs necessary for manufacturing a product corresponding to the order information in the information processing apparatus according to the embodiment of the present invention.

FIG. 10 is a flowchart showing the flow of processes from reading of order information to generation and registration of information about jobs necessary for manufacturing a product corresponding to the order information in the information processing apparatus 101 according to the embodiment of the present invention. A program for executing each process is stored in the ROM 202 of the information processing apparatus 101, loaded into the RAM 201, and executed by the CPU 200.

The order information registration unit 301 reads order information on a placed order, analyzes the order information, and passes analysis results to the control unit 300 (S1001). The analysis results mean information about a product corresponding to the order information. The control unit 300 extracts a file path of an image file from the analysis results and acquires the image file based on the file path (S1002).

The control unit 300 registers the image file acquired in step S1002 in the feature DB 304 (S1003). At this time, an image ID of the image file is generated. Further, since job transmission is not yet started, "False" is set to column 802 of the above-described information in FIG. 8 stored in the feature DB 304.

The control unit 300 acquires the generated image ID of the image file from the feature DB 304 and passes the acquired image ID and the analysis results to the order information registration unit 301 (S1004). The order information registration unit 301 requests the order information management unit 302 to store the image ID and analysis results received from the control unit 300 in the order information storage unit 303. Upon receipt of the request from the order information registration unit 301, the order information management unit 302 associates the image ID with the analysis results and stores them in the order information storage unit 303 (S1005).

The job generation unit 306 generates steps necessary for manufacturing the ordered product as jobs based on the analysis results (S1006). The job management unit 307 stores the jobs generated by the job generation unit 306 in the job storage unit 308 (S1007).

Figure 11:
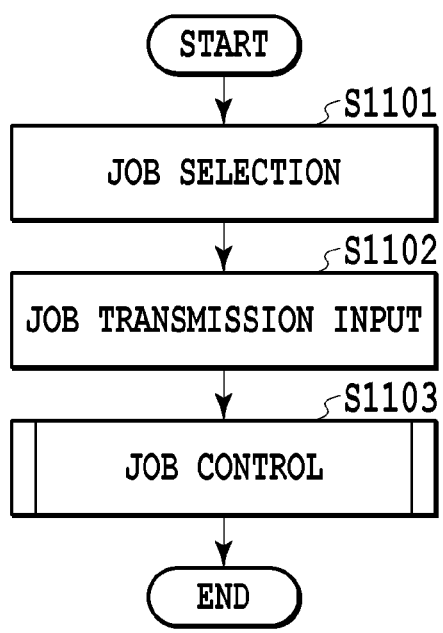
FIG. 11 is a flowchart showing the flow of processes to transmitting jobs from a job transmission unit of the information processing apparatus according to the embodiment of the present invention.

FIG. 11 is a flowchart showing the flow of processes to transmitting jobs from the job transmission unit 309 of the information processing apparatus 101 according to the embodiment of the present invention. A program for executing each process is stored in the ROM 202 of the information processing apparatus 101, loaded into the RAM 201, and executed by the CPU 200.

The job transmission unit 309 selects a job whose transmission process is to be started based on a content input to the keyboard 208 by an operator (S1101). The job transmission unit 309 accepts a job transmission instruction (i.e. a job input instruction) given by the operator as to the job selected in step S1101 (S1102). After accepting the job transmission instruction given by the operator, the information processing apparatus 101 controls execution relating to the job (S1103).

The job selection in step S1101 and the input relating to the job transmission instruction in step S1102 are executed based on the input by the operator in the example shown in FIG. 11, but may be automatically executed by the job transmission unit 309. Next, the process in step S1103 will be described in detail with reference to FIG. 12.

Figure 12:
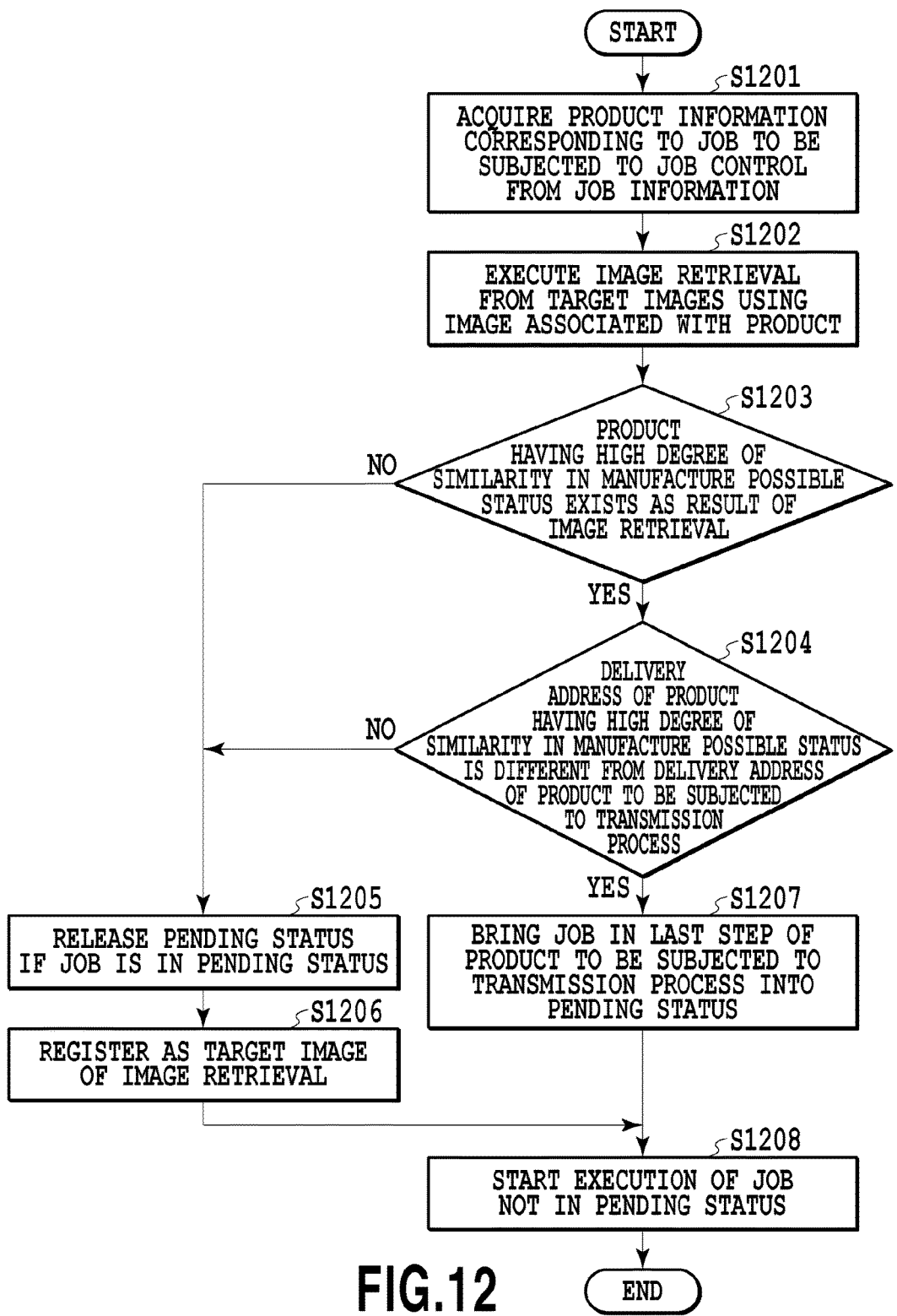
FIG. 12 is a flowchart showing the flow of processes of determining whether to suspend transmission of a job and controlling execution relating to the job in the information processing apparatus according to the embodiment of the present invention.

FIG. 12 is a flowchart showing the flow of processes of determining whether to suspend transmission of a job and controlling execution relating to the job in the information processing apparatus 101 according to the embodiment of the present invention. A program of each process is executed in the information processing apparatus 101. The programs executed in the information processing apparatus 101 are stored in the ROM 202, loaded into the RAM 201, and executed by the CPU 200.

The job transmission unit 309 acquires information on a product to be subjected to job execution control from job information stored in the job storage unit 308 via the job management unit 307 (S1201). The retrieval execution unit 311 executes image retrieval only from images of products in the manufacture possible status stored in the feature DB 304 using an image of the product included in the product information transmitted from the job transmission unit 309 (S1202).

The retrieval execution unit 311 determines whether the degree of similarity between features of the image of the product included in product information transmitted from the job transmission unit 309 and features of the images of the products in the manufacture possible status is equal to or greater than the threshold (S1203). That is, the retrieval execution unit 311 determines whether there is an image of a product in the manufacture possible status that is similar to the image of the product included in the product information transmitted from the job transmission unit 309 as a result of the image retrieval in step S1202.

If the retrieval execution unit 311 retrieves an image having a degree of similarity of features equal to or greater than the threshold (Yes in S1203), the control unit 300 passes an image ID of the retrieved image to the control unit 300 and proceeds to step S1204. If the degree of similarity of features is less than the threshold as to all the images of the products in the manufacture possible status stored in the feature DB 304 (No in S1203), the control unit 300 proceeds to step S1205 without returning an image ID.

Then, in step S1204, the job transmission unit 309 determines whether a delivery address of a product corresponding to the image ID passed to the control unit 300 is different from a delivery address of the product to be subjected to job execution control (S1204). If the job transmission unit 309 determines that these delivery addresses are different from each other (Yes in S1204), the control unit 300 proceeds to step S1207. If the job transmission unit 309 determines that the delivery addresses are no different from each other (No in S1204), the control unit 300 proceeds to step S1205.

That is, if it is determined that the degree of similarity of features is less than the threshold in step S1203, or if the delivery addresses are no different from each other in step S1204, a process in step S1205 is executed. In step S1205, if a job to be subjected to execution control is in the pending status, the job transmission unit 309 releases the pending status of the job (S1205). In other words, the job to be subjected to execution control is brought into a transmission possible status.

The target image management unit 314 makes registration based on the product corresponding to the job to be subjected to execution control such that an image of the product becomes a retrieval target as one of images of products in the manufacture possible status in the feature DB 304 (S1206). That is, the target image management unit 314 changes the value of the manufacture possible status flag from "False" to "True."

On the other hand, if it is determined that the degree of similarity of features is equal to or greater than the threshold in step S1203 and the delivery addresses are different from each other in step S1204, a process in step S1207 is executed. In step S1207, if a job to be subjected to execution control applies to a job in the last step among jobs necessary for manufacturing the product, the job transmission unit 309 brings the job to be subjected to execution control into the pending status (S1207). For example, on condition that the job to be subjected to execution control is a post-process for joining printed matter with a stapler, which is a job in the last step of a manufacturing process of the product, the post-process (job) is brought into the pending status. In step S1208, the job transmission unit 309 transmits a job that is not in the pending status to the image forming apparatus 102 or the post-processing apparatus 103 (S1208). That is, the job transmission unit 309 controls the image forming apparatus 102 or the post-processing apparatus 103 to execute the job.

Figure 13:
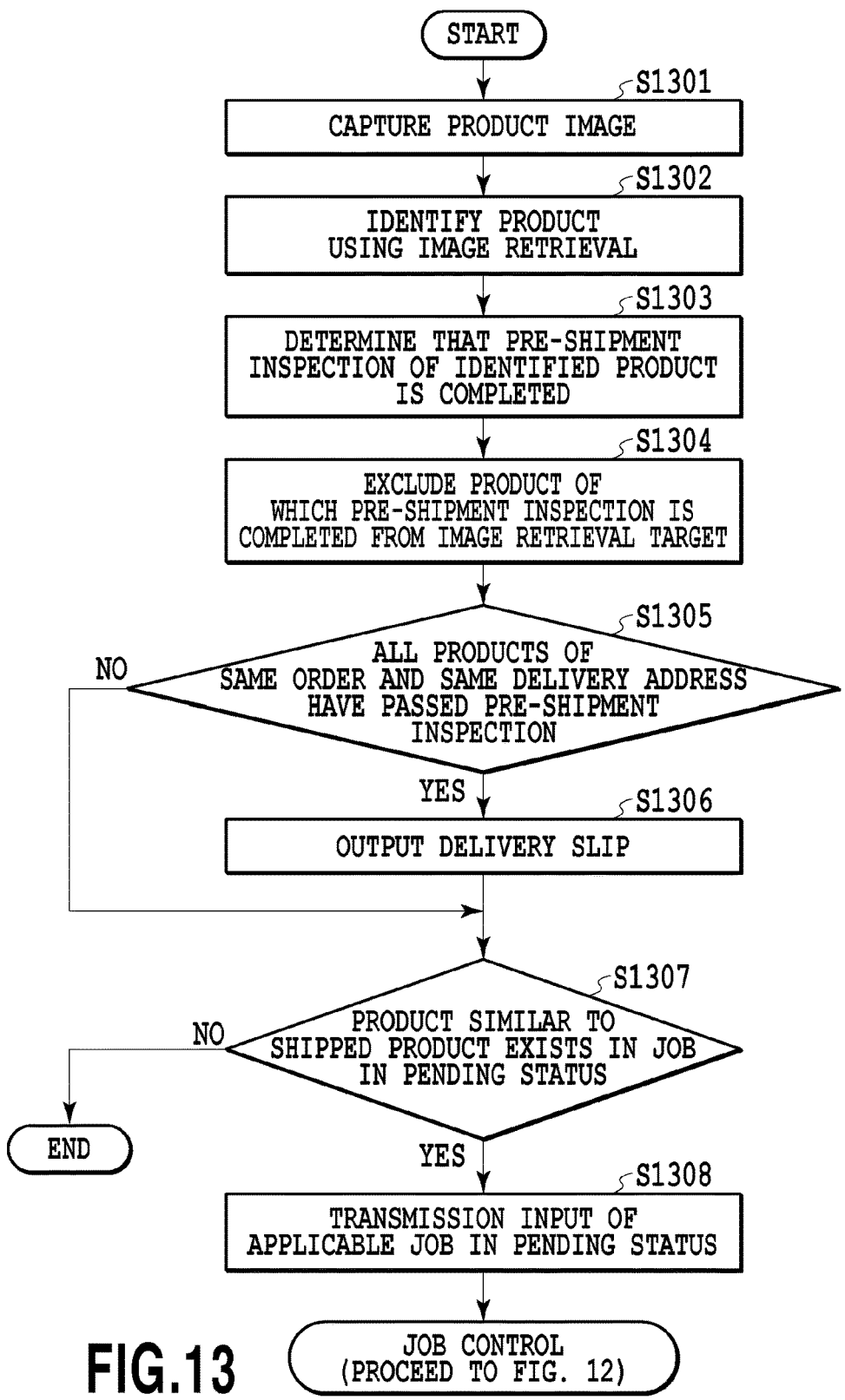
FIG. 13 is a flowchart showing the flow of processes relating to pre-shipment inspection in the product manufacturing system according to the embodiment of the present invention.

FIG. 13 is a flowchart showing the flow of processes relating to pre-shipment inspection in the product manufacturing system according to the embodiment of the present invention. FIG. 13 is based on the premise that the product has been manufactured in the process of step S1103 in FIG. 11 (step S1208 in FIG. 12). A program of each process is executed in the information processing apparatus 101. The programs executed in the information processing apparatus 101 are stored in the ROM 202, loaded into the RAM 201, and executed by the CPU 200.

The image capture control unit 310 captures an image of the manufactured product to generate captured image data (S1301). The retrieval execution unit 311 inputs the generated captured image data to the feature DB 304, executes image retrieval, and identifies the image of the manufactured product (S1302). The retrieval execution unit 311 reads an image ID of the identified product from the feature DB 304 and passes it to the control unit 300.

Upon receiving the image ID of the identified product from the control unit 300, the order information management unit 302 determines that pre-shipment inspection of a product corresponding to the image ID of the identified product has been completed and executes a registration procedure (S1303). The target image management unit 314 changes the value of the manufacture possible status flag in column 802 in FIG. 8 described above to "False" (S1304) such that the product whose pre-shipment inspection has been completed is not a target of image retrieval in the feature DB 304.

The order information management unit 302 determines whether all products of the same order and the same delivery address as those of the product whose pre-shipment inspection has been completed have passed pre-shipment inspection (S1305). If all the products of the same order and the same delivery address have passed pre-shipment inspection, the information processing apparatus 101 proceeds to step S1306. If any of the products of the same order and the same delivery address has not yet passed pre-shipment inspection, the information processing apparatus 101 proceeds to step S1307.

In step S1306, the print data generation unit 312 generates print data for a delivery slip based on the order information on the products that have passed pre-shipment inspection, and the print execution unit 313 transmits the generated print data to the image forming apparatus 104 to execute a printing process of the delivery slip (S1306).

In step S1307, the job transmission unit 309 acquires information on the products that have passed pre-shipment inspection and then determines whether jobs in the pending status include a job relating to a product similar to the products that have passed pre-shipment inspection (S1307). To be more specific, the job transmission unit 309 compares the name of the similar product relating to the pending jobs in column 704 in FIG. 7 described above with the name of the products that have passed pre-shipment inspection, and if they match, the job transmission unit 309 determines that there is a job relating to the product similar to the products that have passed pre-shipment inspection. If it is determined that the jobs in the pending status include a job relating to the product similar to the products that have passed pre-shipment inspection, the job transmission unit 309 proceeds to step S1308. If it is determined that the jobs in the pending status do not include any job relating to the product similar to the products that have passed pre-shipment inspection, the process shown in FIG. 13 is finished.

In step S1307, if it is determined that the jobs in the pending status include a job relating to the product similar to the products that have passed pre-shipment inspection (Yes in S1307), the job transmission unit 309 carries out a transmission instruction of the job (S1308). In the present embodiment, the job transmission instruction in step S1308 is automatically carried out by the job transmission unit 309. The information processing apparatus 101 executes the same job control as that in FIG. 12 described above for the job whose transmission instruction has been carried out in step S1308.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a product can be prevented from being shipped to an incorrect delivery address.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-249674, filed Dec. 22, 2016, which is hereby incorporated by reference wherein in its entirety.

What is claimed is:

1. An information processing apparatus comprising:
a processor; and
a memory that stores a computer program,
wherein the processor executes the computer program to perform:
managing, as retrieval targets, a plurality of images corresponding to products of which jobs have been executed for manufacturing the products;
retrieving an image similar to a first image corresponding to a first product from the plurality of images being managed as the retrieval targets when an instruction to start execution of a first job used for manufacturing the first product is issued;
controlling to execute the first job used for manufacturing the first product and to manage the first image corresponding to the first product as one of the retrieval targets in a case where no image similar to the first image corresponding to the first product is retrieved from the plurality of images being managed as the retrieval targets when the instruction is issued; and
controlling to suspend the first job used for manufacturing the first product in a case where a second image similar to the first image corresponding to the first product is retrieved from the plurality of images being managed as the retrieval targets when the instruction is issued.

2. The information processing apparatus according to claim 1, wherein
the first job used for manufacturing the first product is controlled to be suspended in a case where the second image similar to the first image corresponding to the first product is retrieved from the plurality of images being managed as the retrieval targets when the instruction is issued and a delivery address of the first product is different from a delivery address of the second product corresponding to the second image, and
wherein the first job used for manufacturing the first product is controlled to be executed and the first image corresponding to the first product is managed as one of the retrieval targets in a case where the second image similar to the first image corresponding to the first product is retrieved from the plurality of images being managed as the retrieval targets when the instruction is issued and the delivery address of the first product is the same as the delivery address of the second product.

3. The information processing apparatus according to claim 1, wherein the suspending of the first job used for manufacturing the first product includes suspending a last step among steps included in the first job used for manufacturing the first product.

4. The information processing apparatus according to claim 1, wherein in a case where the second image similar to the first image corresponding to the first product is retrieved from the plurality of images being managed as the retrieval targets when the instruction is issued, the first job used for manufacturing the first product is controlled to be suspended, and the processor further controls to execute the suspended first job used for manufacturing the first product after inspection of the second product is completed.

5. The information processing apparatus according to claim 1, wherein the processor executes the computer program to further perform:
excluding the managed first image corresponding to the first product from the retrieval targets after inspection of the first product is completed.

6. The information processing apparatus according to claim 1, wherein the processor executes the computer program to further perform:
printing a delivery slip for delivering the first product after inspection of the first product is completed.

7. The information processing apparatus according to claim 1, wherein the first product is printed matter.

8. The information processing apparatus according to claim 7, wherein the first job used for manufacturing the first product includes a print job to perform printing for producing the printed matter as the first product in an image forming apparatus and a post-processing job to perform a post-process for the printed matter as the first product in a post-processing apparatus.

9. An information processing method executed by an information processing apparatus, the method comprising:
managing, as retrieval targets, a plurality of images corresponding to products of which jobs have been executed for manufacturing the products;
retrieving an image similar to a first image corresponding to a first product from the plurality of images being managed as the retrieval targets when an instruction to start execution of a first job used for manufacturing the first product is issued;
controlling to execute the first job used for manufacturing the first product and to manage the first image corresponding to the first product as one of the retrieval targets in a case where no image similar to the first image corresponding to the first product is retrieved from the plurality of images being managed as the retrieval targets when the instruction is issued; and
controlling to suspend the first job used for manufacturing the first product in a case where a second image similar to the first image corresponding to the first product is retrieved from the plurality of images being managed as the retrieval targets when the instruction is issued.

10. A non-transitory computer readable storage medium storing a program for causing a computer to execute:
managing, as retrieval targets, a plurality of images corresponding to products of which jobs have been executed for manufacturing the products;
retrieving an image similar to a first image corresponding to a first product from the plurality of images being managed as the retrieval targets when an instruction to start execution of a first job used for manufacturing the first product is issued;
controlling to execute the first job used for manufacturing the first product and to manage the first image corresponding to the first product as one of the retrieval targets in a case where no image similar to the first image corresponding to the first product is retrieved from the plurality of images being managed as the retrieval targets when the instruction is issued; and controlling to suspend the first job used for manufacturing the first product in a case where a second image similar to the first image corresponding to the first product is retrieved from the plurality of images being managed as the retrieval targets when the instruction is issued.

11. The non-transitory computer readable storage medium according to claim 10, wherein the first job used for manufacturing the first product is controlled to be suspended in a case where the second image similar to the first image corresponding to the first product is retrieved from the plurality of images being managed as the retrieval targets when the instruction is issued and a delivery address of the first product is different from a delivery address of the second product corresponding to the second image, and wherein the first job used for manufacturing the first product is controlled to be executed and the first image corresponding to the first product is managed as one of the retrieval targets in a case where the second image similar to the first image corresponding to the first product is retrieved from the plurality of images being managed as the retrieval targets when the instruction is issued and the delivery address of the first product is the same as the delivery address of the second product.

12. The non-transitory computer readable storage medium according to claim 10, wherein the suspending of the first job used for manufacturing the first product includes suspending a last step among all steps included in the first job used for manufacturing the first product.

13. The non-transitory computer readable storage medium according to claim 10, wherein in a case where the second image similar to the first image corresponding to the first product is retrieved from the plurality of images being managed as the retrieval targets when the instruction is issued, the first job used for manufacturing the first product is controlled to be suspended, and the computer further controls to execute the suspended first job used for manufacturing the first product after inspection of the second product is completed.

14. The non-transitory computer readable storage medium according to claim 10, wherein the computer further executes:

excluding the managed first image corresponding to the first product from the retrieval targets after inspection of the first product is completed.

15. The non-transitory computer readable storage medium according to claim 10, wherein the computer further executes:

printing a delivery slip for delivering the first product after inspection of the first product is completed.

16. The non-transitory computer readable storage medium according to claim 10, wherein the first product is printed matter.

17. The non-transitory computer readable storage medium according to claim 16, wherein the first job used for manufacturing the first product includes a print job to perform printing for producing the printed matter as the first product in an image forming apparatus and a post-processing job to perform a post-process for the printed matter as the first product in a post-processing apparatus.

* * * * *